United States Patent [19]

Dai et al.

[11] Patent Number: 5,069,890
[45] Date of Patent: Dec. 3, 1991

[54] ZEOLITE TREATING PROCESS

[75] Inventors: Pei-Shing E. Dai; David E. Sherwood, Jr., both of Port Arthur; Bobby R. Martin, Beaumont, all of Tex.

[73] Assignee: Texaco Inc., White Plains, N.Y.

[21] Appl. No.: 670,838

[22] Filed: Mar. 18, 1991

Related U.S. Application Data

[63] Continuation-in-part of Ser. No. 368,006, Jun. 19, 1989, abandoned.

[51] Int. Cl.$^5$ .............................................. C01B 33/34
[52] U.S. Cl. .................................... 423/328; 502/64; 502/79; 502/78
[58] Field of Search ........................... 502/64, 79, 78; 423/328 Z

[56] References Cited

U.S. PATENT DOCUMENTS

| | | | |
|---|---|---|---|
| 4,357,265 | 11/1982 | Chiang | 502/79 |
| 4,661,239 | 4/1987 | Steigledan | 502/67 |
| 4,663,025 | 5/1987 | Fu | 502/79 |
| 4,668,649 | 5/1988 | Yoshida et al. | 502/79 |
| 4,767,734 | 8/1988 | Ward | 502/66 |
| 4,840,930 | 6/1989 | La Pierre et al. | 502/79 |
| 4,857,171 | 8/1989 | Hoek et al. | 502/79 |
| 4,916,096 | 4/1990 | Hoek et al. | 502/64 |

*Primary Examiner*—Theodore Morris
*Assistant Examiner*—David M. Brunsman
*Attorney, Agent, or Firm*—Robert A. Kulason; James J. O'Loughlin; Carl G. Seutter

[57] ABSTRACT

A novel treated charge zeolite is prepared by treating charge zeolite (which is essentially free of Secondary Pores) with steam for 5-60 hours at 1000° F.–1500° F. Product is particularly characterized by increased Secondary Pore Volume (pores of diameter of 100A–600A) in amount of as high as 0.20 cc/g.

17 Claims, No Drawings

ZEOLITE TREATING PROCESS

RELATED APPLICATION

This application is a continuation-in-part of application Ser. No. 07/368,006, filed June 19, 1989 now abandoned by Texaco Inc. as assignee of Pei Shing Eugene Dai, David Sherwood, and Bobby Ray Martin.

FIELD OF THE INVENTION

This invention relates to a process for treating a zeolite to modify its properties.

BACKGROUND OF THE INVENTION

As is well known to those skilled in the art, zeolite catalysts have been used in hydrocarbon processing. Prior art zeolites have been found to be effective as catalysts for cracking, hydrocracking, hydrosulfurization, etc. Recent trends in resid hydroprocessing demand increased conversion of feed having a boiling point above 1000° F. as well as improved hydrogenation selectivity as measured by Conradson carbon conversion and hydrodenitrogenation (HDN) of the 1000° F.− products attained from cracking of the residue.

It is an object of this invention to provide a process for treating a zeolite to yield a novel treated zeolite catalyst which is characterized by improved properties. Other objects will be apparent to those skilled in the art.

STATEMENT OF THE INVENTION

In accordance with certain of its aspects, this invention is directed to a process of treating a charge zeolite selected from the group consisting of (i) mordenite having a silica to alumina mole ratio of about 10–120, (ii) silicalite having a silica to alumina mole ratio of about 350–370, and (iii) a dealuminated Y-zeolite having a silica to alumina mole ratio of about 3–10 and a Lattice Constant of about 24.30A–24.60A which charge is characterized by the absence of Secondary Pores of diameter of about 100–600A which comprises contacting said charge zeolite with steam at 1000° F.–1500° F.;

maintaining said charge zeolite in said contact with steam for 5–60 hours during which time said charge zeolite is converted into a hydrothermally-treated zeolite characterized by (i) a decreased Lattice Constant of 24.23A–24.38A, (ii) a Secondary Pore Size of 100A–600A, (iii) an increased Secondary Pore Volume of 0.05–0.15 cc/g; and (iv) a Secondary Pore Mode of 100A–325A; and recovering said hydrothermally-treated zeolite.

DESCRIPTION OF THE INVENTION

The charge zeolites which may be treated by the process of this invention are typically characterized by various properties including pore size, unit cell size, silica to alumina mole ratio, etc.

Primary Pore Size — The primary pores are small pores characterized by a pore diameter of less than about 100A, and typically 20A–40A, say 23A. These small or micropores are commonly present together with super micropores having a pore diameter of 40A–100A, say 47A. Pore size is measured by nitrogen desorption isotherm.

Primary Pore Volume — The volume of the primary pores (including micropores and super micropores) is typically 0.08–0.14, say 0.11 cc per gram of charge zeolite. Primary Pore Volume is measured by nitrogen desorption isotherm.

Lattice Constant — The unit cell size (or lattice constant) of the charge zeolites which may be improved by the process of this invention is typically above 24.20A; and it may commonly be 24.30A–24.60A, say 24.57A. Unit cell size is measured by X-ray diffraction.

Secondary Pore Size — The secondary pores are large pores characterized by a pore size (diameter) of greater than 100A, and typically 100A–600A. Secondary pore size is measured by the nitrogen desorption isotherm.

Secondary Pore Volume — The charge zeolites which may be treated by the process of this invention are characterized by a low secondary pore volume. Typical secondary pore volumes are below 0.05 cc/g and commonly in the range of 0.02–0.05 cc/g. Thus the charge zeolites may be considered as being essentially free of secondary pores. Secondary pore volume is measured by the nitrogen desorption isotherm.

Total Pore Volume — The total pore volume of the charge zeolites which may be treated by the process of this invention may be 0.10–0.12 cc/g, say about 0.10 cc/g (as measured by the nitrogen adsorption isotherm).

Total Surface Area — The total pore volume of the charge zeolites which may be treated by the process of this invention may typically be 600–700 $m^2/g$, say 680 $m^2/g$ (as measured by Brunauer-Emmett-Teller (BET) Technique).

Crystallinity — The crystallinity of the charge zeolites which may be treated by the process of this invention may be 85% –1 00%, say 92% (as measured by X-ray diffraction).

Silica-to-Alumina Mole Ratio — The silica-to-alumina mole ratio of the charge compositions which may be treated by the process of this invention may be 6–20, say 8. This is equivalent to a silicon-to-aluminum atom ratio of 3–10, say 4.

Surface Si:Al Atom Ratio —The Surface Si:Al Atom Ratio of the charge zeolite which may be treated by the process of this invention (as measured by X-ray photo electron spectroscopy) may be 1.4 –2.5, say 2.0. This is the ratio which prevails over a depth of 50A on the surface of the particle.

Acid Site Density —The acid site density of the charge zeolites which may be treated by the process of this invention may be 22–32, say 28 cc $NH_3$/gram of measured by temperature programmed desorption of ammonia (TPD).

Acid Resistance — The acid resistance of the charge zeolites which may be treated by the process of this invention may be 0–30%, say 10% (as measured by loss of zeolite crystallinity in contact with a standard acid solution).

The charge zeolites may include a zeolite selected from the group consisting of (i) mordenite having a silica to alumina mole ratio of 10–120, (ii) silicalite having a silica to alumina mole ratio of 350–370, (iii) dealuminated Y-zeolite having a silica to alumina mole ratio of 3–10 and a lattice constant of about 24.30–24.-60A, which charge is particularly characterized by the substantial absence of secondary pores of diameter of about 100–600A.

The charge zeolite may include those characterized by a silica to alumina mole ratio of typically 6–20, say 6 and a Lattice Constant of about 24.30–24.60A, preferably 24.45A–24.60A, say about 24.57A. When the charge is mordenite, it may typically be characterized by a silica to alumina mole ratio of 10-120, preferably 10-20, say about 12. When the charge is a silicalite, it may typically be characterized by a silica to alumina mole ratio of about 350-370, say 350. When the charge is an ultrastable Y-zeolite, it may typically have a silica to alumina mole ratio of 7-14, preferably 6-8, say about 7. and a lattice constant of about 24.50A-24.60A, say 24.57A. When the charge is a super ultrastable Y-zeolite, it may typically have a lattice constant of less than about 24.50A, typically 24.20-24.48A, preferably 24.30-24.40A, say 24.39A. The process of this invention may be particularly useful when the charge zeolite is a dealuminated zeolite typified by an ultrastable zeolite or a super ultrastable zeolite.

Mordenite is a natural zeolite characterized by a 12-membered ring, tubular pores, and the formula $Na_8 (AlO_2)_8(SiO_2)_{40} \, 0.24 \, H_2O$. Silicalite is a zeolite which essentially free of alumina. Faujasite is a natural zeolite characterized by the formula $(Ca, Mg, K_2) \, 29.5 \, (AlO_2)_{59} \, (SiO_2)_{154} \, 0.27 \, H_2O$. Ultrastable zeolites are $NH_4+$ exchanged dealuminated Y-zeolites. Super ultrastable zeolites are $H+$ form of steamed ultrastable Y-zeolites.

The charge zeolite may be in the hydrogen form, the ammonium form, or preferably in an exchanged form i.e. a form in which any alkali metal present has been exchanged for e.g. one or more rare earth metals. Alkali metal is present preferably in amount of less than about 0.5 wt. %. The preferred form is the commercial ammonium form.

Illustrative commercially available zeolites which may be treated by the process of this invention may include the following, the properties of which are set forth in the table which follows:

TABLE

Typical Charge Zeolites

A. The LZ-Y82 brand of Y-zeolite of Union Carbide (an ultrastable zeolite)
B. The Valfor CP 300-56 brand of Y-zeolite of PQ Corp (an ultrastable zeolite)
C. The Valfor CP 300-35 brand of super ultrastable Y-zeolite of PQ Corp
D. The Zelon 900-H brand of mordenite of Norton Company
E. The S-115 brand of silicalite of Union Carbide

TABLE

| Property | CHARGE ZEOLITE | | | | |
|---|---|---|---|---|---|
| | A | B | C | D | E |
| Primary Pore Size A | 22 | 23 | 85 | 39 | 38 |
| Primary Pore Volume cc/g | 0.08 | 0.08 | 0.11 | 0.01 | 0.07 |
| Lattice Constant | 24.51 | 24.57 | 24.35 | — | — |
| Secondary Pore Mode A | none | none | none | none | none |
| Secondary Pore Volume cc/g | 0.02 | 0.02 | 0.12 | 0.004 | 0.003 |
| Total Pore Volume cc/g | 0.10 | 0.11 | 0.23 | 0.02 | 0.07 |
| Total Surface Area m²/g | 626 | 683 | 580 | 413 | 404 |
| Crystallinity % | 100 | 100 | 87 | 95 | 99 |
| $SiO_2$ to $Al_2O_3$ Mole Ratio (XRD) | 8 | 6 | 8 | Ca 12 | 350 |
| Acid Site Density cc/g | 26.2 | 28.9 | 6.5 | 7.0 | 2.3 |
| Acid Resistance % | 20 | 0 | — | — | — |

The preferred charge zeolite is a zeolite such as the LZ-Y82 brand of Y-type zeolite of Union Carbide.

It is a feature of the process of this invention that the charge zeolite is contacted with steam at 1000° F.-1500° F., preferably 1300-1450° F., say about 1400° F. Preferably the steam employed should contain little or no other gases such as an carbon dioxide, oxygen, nitrogen, etc. In the preferred embodiment, the steam will be substantially 100% steam i.e. it contains less than about 10 wt. % of non-steam components. It is found that presence of non-steam components in amount greater than about 10 wt. % is undesirable because it slows down the reaction.

Although operation at temperature slightly below about 1000° F. (say down to about 800° F.) may be employed, it is found that the desired results are attained to a lesser degree. At temperature of about 600° F. or less, the desired changes may not be attained to any desired degree. Operation at temperature above about 1500° F. undesirably increases the cost of operation; and as the temperature rises above this level, there is increasing chance of deactivating the catalyst.

The charge zeolite is maintained at the noted temperature for 5-60 hours, say 16-36, say about 16 hours. Operation below the lower end of this range does not yield significant improvement; and operation above the upper end of the range normally yields little or no additional improvement. It is found that the desired degree of improvement (as measured for example by the increase in the secondary pore volume) is typically obtained after about 16-24 hours. Typically the improvement becomes asymtotic after about 16 hours.

At the conclusion of the desired contacting with steam for 5-60 hours at 1000° F. -1500° F., the treated zeolite is recovered and cooled to ambient temperature.

The characteristics of the treated zeolite may be as follows:

Primary Pore Size — The primary pore size is typically 20A-100A, say about 47A (for the super micropores). Thus it may be observed that there is no significant change in primary pore size.

Primary Pore Volume — The primary pore volume is typically 0.04-0.13, say about 0.08 cc/g. Thus it may be observed that there is no significant change in primary pore volume.

Lattice Constant — The unit cell size (or lattice constant) of the treated zeolite is unexpectedly decreased to as low as 24.23A and typically to 24.23A-24.38A, preferably 24.23-24.29A, typically 24.24-24.27A, say 24.26A. This may represent a desired decreased by 0.07-0.35A, say 0.31A.

Secondary Pore Size — The secondary pore size of the treated zeolite is typically 100-600A and commonly 105A-190A.

Secondary Pore Volume of the treated zeolite is 0.05-0.15, say 0.14 cc/g. It is unexpected that the secondary pore volume may increase by 50% -600%, say 300% over the secondary pore volume of the charge zeolite. (The charge zeolite is particularly characterized by the absence of secondary pores).

Secondary Pore Mode — When the Secondary Pore Volume (in cc/g is plotted as a function of the Secondary Pore Size (the diameter of the Pores in Angstrom Units) in the 100Å-600Å range which defines the Secondary Pores, the resulting curve has its largest value (or peak or maximum) at a point which is called the mode. More specifically the Mode is the value of Pore Size at which the curve has a maximum. Specifically the Secondary Pore Mode is the value of the Secondary Pore Size at which the Secondary Pore Volume is a maximum (in the 100Å-600Å Pore Size range which characterizes the Secondary Pores). Typically the Secondary Pore Mode of the treated product may be above 100A, and commonly about 105A-325A, 25A, typically 135A.

Total Pore Volume — The pore volume of the treated zeolite is 0.16–0.23 cc/g, say 0.20 cc/g which may unexpectedly be 50%–120%, say 90% greater than the total pore volume of the charge zeolite.

Total Surface Area — The total surface area of the treated zeolite is 350–600 m²/g, say 450 m²/g.

Crystallinity - The crystallinity of the treated zeolite is 60%–85%, say 70%.

Silica-to-Alumina Mole Ratio — The silica-to-alumina alumina mole ratio of the treated zeolite is 22–54, say 46. This corresponds to a silicon-to-aluminum atom ratio of 6–27, say 23.

Surface Silicon-to-Aluminum Atom Ratio (in the outer 50A layer) The Si:Al surface ratio of the treated zeolite is 0.8–16, typically 0.9–1.3, say 1.0.

Acid Site Density — The acid site density of the treated zeolite is 1–10, say 6.

Acid Resistance — The acid resistance of the treated zeolite is 90–120, say 100.

It will thus be apparent that the treated zeolite is particularly characterized by (i) the creation of secondary pores of diameter of about 100A–600A from a charge zeolite which is essentially free of secondary pores, (ii) a decrease in the unit cell size (or lattice constant), (iii) a decrease in the crystallinity (zeolite content) and (iv) an increase in the silica-to-alumina ratio. These treated zeolites are also characterized by (i) a primary pore size and volume which is essentially comparable to that of the charge zeolite, (ii) an decrease in total surface area, (iii) a decrease in acid site density and (iv) an increase in acid resistance.

It is a particular feature of the process of this invention that, at a given temperature, as the steaming time increases, the Secondary Pore Volume and Secondary Pore Mode increase; and at about 16 hours, they become asymptotic. It is observed that, at a time below about 5 hours the maximum Secondary Pore Volume is undesirably low (e.g. below about 0.05 cc/g); and the Pore Mode is also undesirably low (e.g. below about 100A). cf. US 4,477,336 to Harshaw/Filtrol as assignee of J. Scherzer. It is also a feature of this invention that, after a steaming time of about 5 hours, the Total Pore Volume and the Pore Mode become essentially an increasing function of temperature.

It is a feature of the treated zeolites of this invention (typically present in particles of particle size of 0.2–2 microns) that they may be mixed with suitable binders, such as silica or alumina to form a mix containing 10–90 wt. % zeolite. This mix may be extruded, dried at 250° F.–400° F., say 350° F., for 0.hour-12 hours, preferably 0.2–8 hours, say 4 hours, calcined at 1100° F.–1400° F., say 1200° F. for 0.5–2 hours, say 1 hour and impregnated with metals which are useful as H-Oil catalysts — typically Ni-Mo, Co-Mo, Ni-Mo-P, Co-Mo-P, etc.

A typical such catalyst may contain 0.5–4 wt. %, say 2.7 wt. %, Ni and 3–15 wt. %, say 10 wt. % Mo on a 1 mm diameter particle containing 80 wt. % alumina and 20 wt. % treated zeolite.

This catalyst may be used in a hydrotreating process. Typically in a hydrotreating process (such as the H-Oil brand of process), reaction is carried out in an ebullated bed reactor containing particulate catalyst. Temperature of operation may be 650° F.–850° F., preferably 750° F.–850° F., say 805° F. at 1000–4000 psig, preferably 2000–3000 psig, say 2500 psig. Space velocity is sufficient to maintain the bed of particulate catalyst in an expanded state. Hydrogen is admitted, with the charge hydrocarbon, in amount of 1000–50,000 SCFB, preferably 5000–10,000 SCFB.

Typical H-Oil feed is an atmospheric reduced crude or a vacuum bottoms; and commonly 75% of the feed boils above 1000° F. It typically may contain 1–10 wt. % sulfur and up to 1000 ppm metals (including nickel and vanadium).

H-Oil product is characterized as a liquid product of lower density and average boiling point, lower sulfur content, and lower content of metals.

It is also a feature of the zeolite product of this invention that it may be useful as a catalyst in hydrocarbon cracking as in a fluid catalytic cracking process wherein hydrocarbon charge, such as a gas oil, is cracked at 900° F.–1100° F., typically 960° F. at 0–20 psig, say 0 psig. It is found that the novel catalyst of this invention may be particularly effective in cracking the 900+° F. ibp fraction of charge gas oils. As determined by the slurry oil in the cracked product (i.e. % of the oil boiling at least as high as 670° F.) the zeolite catalyst of this invention desirably yields crackate having typically 10% less of the slurry oil than prior art zeolites. This is believed to be due to the presence of an increased volume of Secondary Pores (which is typically 0.05–0.15 cc/g, as distinguished from prior art zeolites which are essentially free of Secondary Pores) and an increased Secondary Pore Mode (which is typically 105–190A as distinguished from prior art zeolites which do not have a Secondary Pore Mode -because of the absence of Secondary Pores).

DESCRIPTION OF SPECIFIC EMBODIMENTS

Practice of the process of this invention will be apparent to those skilled in the art from the following wherein all parts are parts by weight unless otherwise stated. An asterisk indicates a control example.

EXAMPLE I

In this example, which represents the best mode presently known of carrying out the process of this invention, the charge zeolite is the Valfor CP300-5 brand of ultrastable Y-type zeolite (in ammonium form) of PQ Corp. This Y-zeolite is characterized by the properties set forth in the table infra.

In this example, the zeolite is contacted with essentially 100% steam for 24 hours at 1400° F. This charge zeolite and the treated zeolite at the end of the treating period are characterized as in the following table:

TABLE

| Property | Charge Zeolite | Steam Treated Zeolite |
| --- | --- | --- |
| Primary Pore Size A | 23 | 47 |
| Primary Pore Volume cc/g | 0.08 | 0.07 |
| Lattice Constant A | 24.57 | 24.26 |
| Secondary Pore Mode A | None | 135 |
| Secondary Pore Volume cc/g | 0.02 | 0.14 |
| Total Pore Volume cc/g | 0.11 | 0.20 |
| Total Surface Area m²/g | 683 | 456 |
| Crystallinity % | 100 | 70 |
| SiO₂ to Al₂O₃ Mole Ratio | 6 | 46 |
| Acid Site Density % | 28.9 | 6 |
| Acid Resistance % | 0 | 100 |

Preparation of catalyst from this treated zeolite may be carried out by mixing 20 parts of zeolite and 80 parts of gamma alumina, extruding to form 1 mm X 6mm cylinders, drying at 350° F. for 4 hours, calcined at 1200° F. for one hour, and then loading. The particles are loaded by immersing in nickel nitrate solution for 24 hours, drying at 250° F. for 4 hours, and calcining at 1200° F. for one hour. The particles are then immersed in aqueous ammonium molybdate solution for 24 hours, dried at 350° F. for 4 hours, and calcined at 1200° F. for one hour.

This catalyst may be employed in an H-Oil process to which is charged an Arabian Medium/Heavy Vacuum Resid having the following properties:

TABLE I

| Typical Petroleum Feedstock (Arabian Medium/Heavy Vacuum Resid) | |
|---|---|
| API Gravity | 4.8 |
| 1000° F.+, vol % | 87.5 |
| 1000° F.+, wt % | 88.5 |
| Sulfur, wt % | 5.0 |
| Total Nitrogen, wppm | 4480 |
| Hydrogen, wt % | 10.27 |
| Carbon, wt % | 84.26 |
| Alcor MCR, wt % | 22.2 |
| Kinematic Viscosity, cSt | |
| @ 212 F | 2430 |
| @ 250 F | 410 |
| @ 300 F | 117 |
| Pour Point, °F. | 110 |
| n-C$_5$ Insolubles, wt % | 28.4 |
| n-C$_7$ Insolubles, wt % | 9.96 |
| Toluene Insolubles, wt % | 0.02 |
| Asphaltenes, w % | 9.94 |
| Metals, wppm | |
| Ni | 49 |
| V | 134 |
| Fe | 10 |
| Cu | 3 |
| Na | 49 |
| Chloride, wppm | 28 |

Charge may be admitted in liquid phase at 770° F. and 2250 psig to an ebullated bed of catalyst. Space velocity LHSV is 0.56. Hydrogen is admitted in amount of 7000 SCFB.

Hydrocarbon product may be characterized by increased production of liquid boiling below 1000° F.

EXAMPLES II-VIII

In order to determine the effect of steaming time at 1420° F. on the charge LZ-Y82 brand of ultrastable zeolite, several runs were carried out in which the zeolite content, the Si:Al ratio, and the lattice constant of the steamed (hydrothermally treated) zeolite inter alia were determined as a function of the time of steaming. The results are tabulated as follows:

TABLE

| Example | Steaming Time Hrs. | Sec Pore Mode A | Zeolite Content % | SiO$_2$ Al$_2$O$_3$ Mole Ratio | Lattice Cons. A | Sec Pore Vol 100–600A cc/g | Surf Si:Al Atom Ratio |
|---|---|---|---|---|---|---|---|
| II* | 0 | 47 | 100 | 8 | 24.51 | 0.02 | 1.5 |
| III* | 2 | 78 | 87 | 16 | 24.38 | 0.05 | 1.0 |
| IV | 8 | 105 | 80 | 26 | 24.31 | 0.07 | 0.9 |
| V | 16 | 145 | 62 | 46 | 24.26 | 0.10 | 0.9 |
| VI | 24 | 125 | 66 | 54 | 24.25 | 0.11 | 0.9 |
| VII | 24 | 125 | 64 | 46 | 24.26 | 0.10 | 0.9 |
| VIII | 48 | 125 | 61 | 40 | 24.27 | 0.12 | 0.9 |

From these Examples, it is apparent that, as the steaming time increases;
 (i) the zeolite content (i.e. Crystallinity) of the treated product drops to a level of about 60–65%;
 (ii) the SiO$_2$:Al$_2$O$_3$ Mole Ratio (as determined by XRD) increases to about 40–54 at which point it levels off i.e. the zeolite becomes dealuminated
 (iii) the Surface Si:Al atom ratio drops from 1.5 down to 0.9 indicating that the surface becomes aluminum-enriched.
 (iv) the Lattice Constant drops to as low as 24.25A;
 (v) the Secondary Pore Volume of the treated product increases to about 0.12 (an increase by a factor of 6); and
 (vi) the Secondary Pore Mode increase from 47 up to about 125;
 (vii) a point is reached after about 16–24 hours after which no significant change appears to occur.

EXAMPLES IX-XII

In a further series of runs, the charge zeolite of Example I is steamed for 24 hours at different tempera-tures, and the pore volumes are measured in addition to other criteria reported below:

TABLE

| | Desorption Pore Volume Distribution | | | |
|---|---|---|---|---|
| Example | Temp °F. | 20–100A | 100–600A | Pore Mode A |
| IX | 1350 | 0.10 | 0.07 | 105 |
| X | 1420 | 0.08 | 0.10 | 115–125 |
| XI | 1450 | 0.07 | 0.12 | 145 |
| XII | 1470 | 0.07 | 0.09 | 170 |

It is apparent from the above table that, as the steaming temperature increases within the desired range of 1000° F.–1500° F., the volume of pores in the 20–100A range decreases; and the volume of pores in the secondary pore size range (100–600A) increases.

TABLE

| | Example Steaming Temp. | | | |
|---|---|---|---|---|
| Property | IX 1350° F. | X 1420° F. | XI 1450° F. | XII 1470° F. |
| Zeolite Content % | 64 | 65 | 58 | 60 |
| SiO$_2$/Al$_2$O$_3$, Mole Ratio (XRD) | 46 | 46 | 64 | 64 |
| Lattice Constant A | 24.26 | 24.26 | 24.24 | 24.24 |
| Surface Si:Al Atom Ratio (XPS) | 0.9 | 0.8 | 0.8 | 0.8 |
| Surface Area m$^2$g | 457 | 411 | 392 | 376 |
| Total Pore Volume cc/g | 0.17 | 0.19 | 0.16 | 0.19 |

EXAMPLES XIII-XVII

In this series of Examples, the procedure of Examples I-VIII is followed using as the charge Y-zeolite the Valfor CP 300-56 brand of Ultrastable Y-zeolite in ammonium form of PQ Corp characterized by the properties set forth in the text supra.

TABLE

| Example | Steaming Time Hrs. | Secondary Pore Mode A | Cryst. % | Mole Ratio | SiO2:Al2O3 Atom Ratio | Surf Si:Al Lattice Cons. A | Secondary Pore Vol 100-600A |
|---|---|---|---|---|---|---|---|
| XIII* | 0 | 47 | 127 | 8 | 1.8 | 24.54 | 0.05 |
| XIV* | 0 | 43 | 123 | 6 | 2.0 | 24.57 | 0.02 |
| XV | 8 | 115 | 85 | 40 | 1.0 | 24.27 | 0.13 |
| XVI | 24 | 190 | 69 | 40 | 0.9 | 24.27 | 0.19 |
| XVII | 28 | 325 | 57 | 40 | 1.0 | 24.27 | 0.11 |

Crystallinity in this table is relative to that of the commercially available LZ Y-82 zeolite.

EXAMPLES XVIII-XXVII

In this series of Examples, the procedure of Example I-VIII is duplicated using as charge the CP30056 brand ultrastable Y-zeolite catalyst.

TABLE

| Example | Steaming Time Hrs. | Pore Mode A | Secondary Pore Vol % 100-600A |
|---|---|---|---|
| XVIII* | 0 | 43 | 0.02 |
| XIX* | 5 | 135 | 0.12 |
| XX | 8 | 125 | 0.13 |
| XXI | 16 | 145 | 0.14 |
| XXII | 24 | 170 | 0.17 |
| XXIII | 48 | 190 | 0.20 |

It will be noted that the composition of this Table (unlike that of Example II-VIII) is characterized by a Pore Mode and a Secondary Pore Volume which unexpectedly do not level off as they do in Examples II-VIII with an increase in steaming time beyond 16 hours. This provides flexibility in adjusting a product catalyst so that it may be prepared to maximize effectivity for removal of asphaltenes or removal of sulfur, each of which may be most effectively accomplished at different Pore Modes or Secondary Pore Volumes.

EXAMPLES XXIV-XXIX

In this series of Examples, the procedure of Examples II-VIII is duplicated except that the temperature of steaming is 1470° F. instead of 1420° F.

TABLE

| Example | Steaming Time Hrs. | Pore Mode A | Crysta % | SiO2 Al2O3 Mole Ratio | Sur Si:Al Atom Ratio | Lattice Cons. A | Sec Pore Vol 100-600A |
|---|---|---|---|---|---|---|---|
| XXIV* | 0 | 47 | 100 | 8 | 1.5 | 24.51 | 0.02 |
| XXV* | 2 | 98 | 80 | 28 | 0.9 | 24.30 | 0.05 |
| XXVI | 5 | 110 | 69 | 54 | 0.8 | 24.25 | 0.10 |
| XXVII | 8 | 125 | 67 | 54 | 0.8 | 24.25 | 0.12 |
| XXIX | 24 | 190 | 60 | 64 | 0.8 | 24.24 | 0.10 |

EXAMPLES XXX-XXXVIII

In the series of Examples, the procedure of Examples IX-XII is employed except that the zeolite charge is the Valfor CP300-56 brand of Ultrastable zeolite in ammonium form of PQ Corp which is steamed for 24 hours at the noted temperature.

TABLE

| Example | Steaming Temp °F. | Zeolite Content % | SiO2 Al2O3 Mole Ratio | Lattice Constant A | Pore Mode A | Secondary Pore Vol % 100-600A |
|---|---|---|---|---|---|---|
| XXX* | Untreated | 100 | 6 | 24.57 | 23,43 | 0.02 |
| XXXI | 1100 | 82 | 16 | 24.38 | 43,115 | 0.16 |
| XXXII | 1250 | 78 | 26 | 24.31 | 115-125 | 0.17 |
| XXXIII | 1350 | 74 | 32 | 24.29 | 115-125 | 0.17 |
| XXXIV | 1400 | 61 | 46 | 24.26 | 135,170 | 0.20 |
| XXXV | 1420 | 65 | 46 | 24.26 | 145,165 | 0.16 |
| XXXVI | 1450 | 63 | 64 | 24.24 | 145,170 | 0.21 |
| XXXVII | 1470 | 58 | 18 | 24.24 | 145,170 | 0.18 |

From the above table, it will be apparent that the process of this invention permits attainment of zeolite which is dealuminized and which is characterized by an aluminum-enriched surface and by partial destruction of the zeolite crystal structure and by increased secondary porosity (i.e. pores in the 100-600A region). These products contain domains of high thermal and hydrothermal stability separated by holes or amorphous domains which contribute to the decrease of the average crystalline fraction. Non-framework alumina and silica-alumina created during the hydrothermal stabilization process may be present in the intracrystalline voids or included in the retained crystalline framework structure.

It is a characteristic of the products of the process of this invention that they contain secondary pores of about 105-190A size, that the pore volume of pores of diameter of 100-600A may be increased by 0.05-0.15 cc/g, that the surface of the treated zeolite is enriched with respect to aluminum, that the total acid site density may be decreased, and that the treated zeolite may be characterized by increased enhancement in acid resistance.

EXAMPLE XXXVIII

In this Example, which shows use of the product zeolites of this invention in fluid catalytic cracking (FCC), the catalyst tested is the pure zeolite of Example XX (in hydrogen form). The charge hydrocarbon is a high nitrogen Vacuum Gas Oil into which has been blended atmospheric resid. This charge has an ibp of 484° F., a 50% b.p. of 780° F., and a 95% bp of 993° F. It is characterized by a slurry oil content (i.e.% of charge which is characterized by a boiling point above 670° F.) of 82%.

Operating conditions include 960° F. at 0 psig; and catalyst-to-oil ratio is 3 and the WHSV is 32.

Cracked product is characterized by a slurry oil content of 56%. It is apparent that the slurry oil content has been desirably decreased from 82% down to 56%. Typical prior art zeolites give a slurry oil content of about 72%.

Although this invention has been illustrated by reference to specific embodiments, it will be apparent to those skilled in the art that various charges and modifications may be made which clearly fall within the scope of the invention.

We claim:

1. A process of treating a charge zeolite selected from the group consisting of (i) mordenite having a silica to alumina mole ratio of about 10–120, (ii) silicalite having a silica to alumina mole ratio of about 350–370, and (iii) dealuminated Y-zeolite having a silica to alumina mole ratio of about 3–10 and a Lattice Constant of about 24.30A–24.60A, which charge is characterized by the absence of secondary pores of diameter of about 100–600A which comprises contacting said charge zeolite with steam at 1000° F.–1500° F.; maintaining said charge zeolite in said contact with steam for 5–60 hours during which time, said charge zeolite is converted into a hydrothermally-treated zeolite characterized by (i) decreased Lattice Constant of 24.23A–24.38A, (ii) a Secondary Pore Size of 100A–600A, (iii) an increased Secondary Pore Volume of 0.05–0.15 cc/g and (iv) a Secondary Pore Mode of 100A–325A; and recovering said hydrothermally-treated zeolite.

2. A process of treating a charge zeolite as claimed in claim 1 wherein said charge zeolite is a dealuminated Y-zeolite having a silica to alumina mole ratio of about 3–10.

3. A process of treating a charge zeolite as claimed in claim 1 wherein said charge zeolite is a mordenite having a silica to alumina mole ratio of about 10–120.

4. A process of treating a charge zeolite as claimed in claim 1 wherein said charge zeolite is a silicalite having a silica to alumina mole ratio of about 350–370.

5. A process of treating a charge zeolite as claimed in claim 1 wherein said contacting with steam is carried out at 1300° F.–1450° F.

6. A process of treating a charge zeolite as claimed in claim 1 wherein said contacting with steam is carried out at about 1400°.

7. A process of treating a charge zeolite as claimed in claim 1 wherein said contacting with steam is carried out for 16–36 hours.

8. A process of treating a charge zeolite as claimed in claim 1 wherein said contacting with steam is carried out for about 16 hours.

9. A process of treating a charge dealuminated ultrastable Y-zeolite in ammonium form having a silica to alumina mole ratio of 7–14 and a lattice constant of 24.50A–24.60A which comprises contacting said charge zeolite with steam at 1300° F.–1450° F.;

maintaining said charge zeolite in said contact with steam for 16–36 hours during which time said charge zeo-lite is converted into a hydrothermally-treated zeolite characterized by (i) a decreased unit cell size of 24.23–24.38A, (ii) a Secondary Pore Size of 100A–600A, (iii) an a Secondary Pore Volume of 0.05–0.15cc/g, and (iv) a Secondary Pore Mode of 100A–325A; and recovering said hydrothermally-treated zeolite.

10. A novel zeolite characterized by (i) a lattice constant of about 24.23A–24.38A, (ii) a Secondary Pore Size of 100A–600A, (iii) an increased Secondary Pore Volume of 0.05–0.15 cc/g and (iv) a Secondary Pore Mode of 100A–325A.

11. A novel hydrothermally treated, dealuminated Y-zeolite characterized by (i) a Lattice Constant of 24.23A–24.38A, (ii) a Secondary Pore Size of 100A–600A, (iii) an increased Secondary Pore Volume of 0.05–0.15 cc/g, and (iv) a Secondary Pore Mode of 100–325A.

12. A novel hydrothermally treated, dealuminated Y-zeolite as claimed in claim 11 wherein said decreased Lattice Constant is 24.23A–24.29A.

13. A novel hydrothermally treated, dealuminated Y-zeolite as claimed in claim 11 wherein said dealuminated Y-zeolite is prepared from a charge mordenite having a silica to alumina mole ratio of about 10–120.

14. A novel hydrothermally treated, dealuminated Y-zeolite as claimed in claim 11 wherein said dealuminated Y-zeolite is prepared from a charge silicalite having a silica to alumina mole ratio of about 350–370.

15. A novel hydrothermally treated, dealuminated Y-zeolite as claimed in claim 11 wherein said dealuminated Y-zeolite is prepared from a charge dealuminated ultrastable Y-zeolite having a silica to alumina mole ratio of 7–14.

16. A novel hydrothermally treated, dealuminated Y-zeolite as claimed in claim 11 wherein said dealuminated Y-zeolite is prepared from a charge dealuminated super ultrastable Y-zeolite having a Lattice Constant of about 24.30A–24.60A.

17. A novel hydrothermally treated dealuminated zeolite prepared by the process which comprises contacting, with steam at 1000° F.–1500° F. a charge zeolite selected from the group consisting of (i) mordenite having a silica to alumina mole ratio of about 10–120, (ii) silicalite having a silica to alumina mole ratio of about 350–370, (iii) dealuminated Y-zeolite having a silica to alumina mole ratio of about 3–10 and a Lattice Constant of about 24.30A–24.60A, which charge is characterized by the absence of secondary pores of diameter of about 100–600A, maintaining said charge zeolite in said contact with steam for 5–60 hours during which time, said charge zeolite is converted into a hydrothermally-treated zeolite characterized by (i) decreased Lattice Constant of 24.23A–24.38A, (ii) a Secondary Pore Size of 100A–600A, (iii) a Secondary Pore Volume of 0.05–0.15 cc/g and (iv) a Secondary Pore Mode of 100A–325A; and recovering said hydrothermally-treated zeolite.

* * * * *